US010773687B2

(12) United States Patent
Ohi et al.

(10) Patent No.: US 10,773,687 B2
(45) Date of Patent: Sep. 15, 2020

(54) ELECTRONIC KEY SYSTEM (71) Applicant: Mazda Motor Corporation, Aki-gun, Hiroshima (JP)

(72) Inventors: Yasuhiro Ohi, Hiroshima (JP); Yoshitaka Kimura, Hiroshima (JP); Shotaro Hirosue, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/341,317

(22) PCT Filed: Oct. 11, 2017

(86) PCT No.: PCT/JP2017/036755
§ 371 (c)(1),
(2) Date: Apr. 11, 2019

(87) PCT Pub. No.: WO2018/070401
PCT Pub. Date: Apr. 19, 2018

(65) Prior Publication Data
US 2020/0047713 A1    Feb. 13, 2020

(30) Foreign Application Priority Data
Oct. 12, 2016  (JP) .................... 2016-200985

(51) Int. Cl.
*B60R 25/24*    (2013.01)
(52) U.S. Cl.
CPC .......... *B60R 25/241* (2013.01); *B60R 25/245* (2013.01)

(58) Field of Classification Search
None
See application file for complete search history.

(56) References Cited

U.S. PATENT DOCUMENTS

| 7,667,580 | B2* | 2/2010 | Tauchi | B60R 25/04 340/426.1 |
| 8,207,817 | B2* | 6/2012 | Kamiya | G07C 9/00309 340/5.7 |
| 10,518,748 | B2* | 12/2019 | Ohi | H04Q 9/00 |
| 2004/0150512 | A1 | 8/2004 | Yoshikawa | |

FOREIGN PATENT DOCUMENTS

| JP | 2004169316 A | 6/2004 |
| JP | 2016079600 A | 5/2016 |

* cited by examiner

*Primary Examiner* — K. Wong
(74) *Attorney, Agent, or Firm* — Alleman Hall Creasman & Tuttle LLP (57) ABSTRACT

Disclosed is an electronic key system which comprises a vehicle-mounted device and a plurality of electronic keys, and is configured to have: a normal mode in which a given processing is permitted to be executed by the vehicle-mounted device when a given wireless communication processing between the vehicle-mounted device and any one of the plurality of electronic keys is successfully completed; and a deactivated mode in which the given processing is inhibited from being executed by the vehicle-mounted device. The vehicle-mounted device is configured not to execute, in the deactivated mode, the given processing even when receiving an RF signal after transmitting an LF signal, during the given wireless communication processing, and the one electronic key is configured not to transmit, in the deactivated mode, the RF signal even when receiving the LF signal, during the given wireless communication processing.

6 Claims, 3 Drawing Sheets

ELECTRONIC KEY SYSTEM

TECHNICAL FIELD

The present invention relates to an electronic key system, and more particularly to an electronic key system in which a given operation is executed in a vehicle in response to an action of a user who carries an electronic key.

BACKGROUND ART

Heretofore, a vehicle having a smart (advanced) keyless function has been known. This type of vehicle is configured such that a user who carries an electronic key can cause a desired processing to be executed in the vehicle, simply by performing a given manipulation. For example, through the use of the smart keyless function, the user can automatically unlock a door of a vehicle simply by touching a sensor provided on a door knob (or by pushing a switch provided on the door) and then automatically lock the door simply by manipulating a manipulation section provided on the vehicle when closing the door, and can start an engine simply by pushing an engine switch.

In order to fulfill such a smart keyless function, a vehicle-mounted device mounted to a vehicle and an electronic key carried by a user are configured to be triggered by each of the above manipulations to execute a given communication processing therebetween. Then, if this communication processing (i.e., authentication) is successfully completed, a given processing will be executed in the vehicle.

Typically, in the communication processing, a first communicable distance of the electronic key with respect to the vehicle-mounted device is relatively long (e.g., several tens of meters or more), whereas a second communicable distance of the vehicle-mounted device with respect to the electronic key is relatively short (e.g., about 1 m). Therefore, the smart keyless function can be effectively enabled when a user who carries the electronic key moves close to or stays within the vehicle. That is, in a situation where the user (i.e., the electronic key) is located at a position away from the vehicle by a distance greater than the second communicable distance which is about 1 m, the door of the vehicle is never unlocked, for example, even if a third party touches the sensor of the door knob.

However, in recent years, the presence of a new modus operandi for vehicle theft, called "relay attack", has been revealed. This modus operandi comprises amplifying a communication radio wave by a relay (repeater) so that the communication processing can be successfully completed between the electronic key and the vehicle-mounted device even when they are far apart from each other, thereby enabling the smart keyless function. With to the aim of preventing vehicle theft using the relay attack, there has been proposed, as a countermeasure against the relay attack, a technique of deactivating the smart keyless function based on a user's own will (See, for example, Patent Document 1). In the technique described in the Patent Document 1, the user can temporarily deactivate the smart key function, for example, by performing a specific deactivation manipulation, using the electronic key.

CITATION LIST

Parent Document

Patent Document 1: JP 2016-79600A

SUMMARY OF INVENTION

Technical Problem

However, in the technique described in the Patent Document 1, in a situation where there are a plurality of electronic keys for one vehicle, even if the smart keyless function is temporarily deactivated by using a certain one of the electronic keys to counter the relay attack, this relay attack countermeasure is likely to fail to effectively work for the remaining electronic keys.

The present invention has been made in order to solve this problem, and an object thereof is to provide an electronic key system capable of reliably fulfilling the function of a relay attack countermeasure even in a situation where there are a plurality of electronic keys for one vehicle.

Solution to Technical Problem

In order to achieve the above object, the present invention provides an electronic key system which comprises a vehicle-mounted device mounted to a vehicle, and a plurality of electronic keys each wirelessly communicable with the vehicle-mounted device, wherein the electronic key system is configured to have: a normal mode in which a given processing is permitted to be executed by the vehicle-mounted device when a given wireless communication processing between the vehicle-mounted device and any one of the plurality of electronic keys is successfully completed; and a deactivated mode in which the given processing is inhibited from being executed by the vehicle-mounted device, wherein: the vehicle-mounted device is configured to execute, in the normal mode, the given processing in response to receiving a reply signal from the electronic key after transmitting a given radio signal to the electronic key, during the given wireless communication processing, but not to execute, in the deactivated mode, the given processing even when receiving the reply signal after the transmitting of the radio signal; and the one electronic key is configured to transmit, in the normal mode, the reply signal in response to receiving the radio signal, during the given wireless communication processing, but not to transmit, in the deactivated mode, the reply signal even when receiving the radio signal.

In the electronic key system of the present invention having the above feature, during the course of execution of the given wireless communication processing between the vehicle-mounted device and any one of the plurality of electronic keys, even when the vehicle-mounted device receives a reply signal from the electronic key after transmitting a radio signal to the electronic key, the vehicle-mounted device does not execute the given processing as long as it is operated in the deactivated mode, or, even when the electronic key receives a radio signal from the vehicle-mounted device, the electronic key does not transmit any reply signal responding to the radio signal as long as it is operated in the deactivated mode, so that the given wireless communication processing is never successfully completed, and thereby the given processing is inhibited from being executed by the vehicle-mounted device. As above, in the electronic key system of the present invention, as long as at least one of the vehicle-mounted device and the one electronic key is in the deactivated mode, a smart (advanced) keyless function can be disabled to protect the vehicle from the relay attack. That is, as long as at least one of a combination of the vehicle-mounted device and any one of the plurality of electronic keys is in the deactivated mode, it becomes possible to effectively cope with the relay attack. Thus, for example, even in a situation where only part of the plurality of electronic keys are in the deactivated mode, it becomes possible to effectively cope with the relay attack, even under the combination of the vehicle-mounted device and any one of the plurality of electronic keys as long as at least this vehicle-mounted device is in the deactivated mode. On the other hand, under a combination of the vehicle-mounted device and any one of the electronic keys being in the deactivated mode, it becomes possible to effectively cope with the relay attack, irrespective of such a control mode in the vehicle-mounted device. Therefore, in the electronic key system of the present invention, it is possible to reliably fulfill the function of a relay attack countermeasure even when there are a plurality of electronic keys.

Preferably, in the electronic key system of the present invention, each of the vehicle-mounted device and the plurality of electronic keys is operable independently in either one of the normal mode and the deactivated mode in a selective manner.

According to this feature, each of the vehicle-mounted device and the plurality of electronic keys can be shifted to the deactivated mode, independently. Thus, there is a possibility that one and the other of the combination of the vehicle-mounted device and any one of the plurality of electronic keys are, respectively, in the deactivated mode and in the normal mode, when the vehicle is subjected to the relay attack. However, in the electronic key system of the present invention, as long as at least one of the combination of the vehicle-mounted device and any one of the plurality of electronic keys is in the deactivated mode, it becomes possible to effectively cope with the relay attack. Thus, a user can protect the vehicle from the relay attack simply by shifting at least one of the vehicle-mounted device and any one of the electronic keys to the deactivated mode.

Preferably, in the electronic key system of the present invention, each of the plurality of electronic keys comprises a mode-shifting manipulation member for causing a shift from the normal mode to the deactivated mode, wherein each of the plurality of electronic keys is operable, in response to manipulation of the mode-shifting manipulation member thereof, to be shifted to the deactivated mode.

According to this feature, the user can shift each of the plurality of electronic keys to the deactivated mode by manipulating the mode-shifting manipulation member thereof.

More preferably, in the above electronic key system, each of the plurality of electronic keys is operable, upon a shift to the deactivated mode, to transmit a deactivated mode notification signal, and the vehicle-mounted device is operable, in response to receiving the deactivated mode notification signal, to be shifted to the deactivated mode.

According to this feature, a user can shift each of the plurality of electronic keys to the deactivated mode and further shift the vehicle-mounted device to the deactivated mode, by manipulating the electronic key.

Preferably, in the electronic key system of the present invention, each of the plurality of electronic keys comprises a mode-restoring manipulation member, wherein each of the plurality of electronic keys is operable, in response to manipulation of the mode-restoring manipulation member thereof, to be restored to the normal mode, while transmitting a normal mode notification signal, and the vehicle-mounted device is operable, in response to receiving the normal mode notification signal, to be restored to the normal mode.

According to this feature, a user can restore each of the plurality of electronic keys to the normal mode and further restore the vehicle-mounted device to the normal mode, by manipulating the mode-restoring manipulation member of the electronic key.

Preferably, in the electronic key system of the present invention, each of the vehicle-mounted device and the plurality of electronic keys comprises memory, wherein the memory stores therein a deactivated mode flag for distinguishing the deactivated mode from the normal mode.

According to this feature, each of the vehicle-mounted device and the plurality of electronic keys can be easily controlled with respect to the control modes of the deactivated mode and the normal mode, using the deactivated mode flag stored in the memory.

Effect of Invention

The electronic key system of the present invention is capable of reliably fulfilling the function of a relay attack countermeasure even in a situation where there are a plurality of electronic keys for one vehicle.

DESCRIPTION OF EMBODIMENTS

With reference to the accompanying drawings, the present invention will now be described based on one embodiment thereof.

Figure 1:
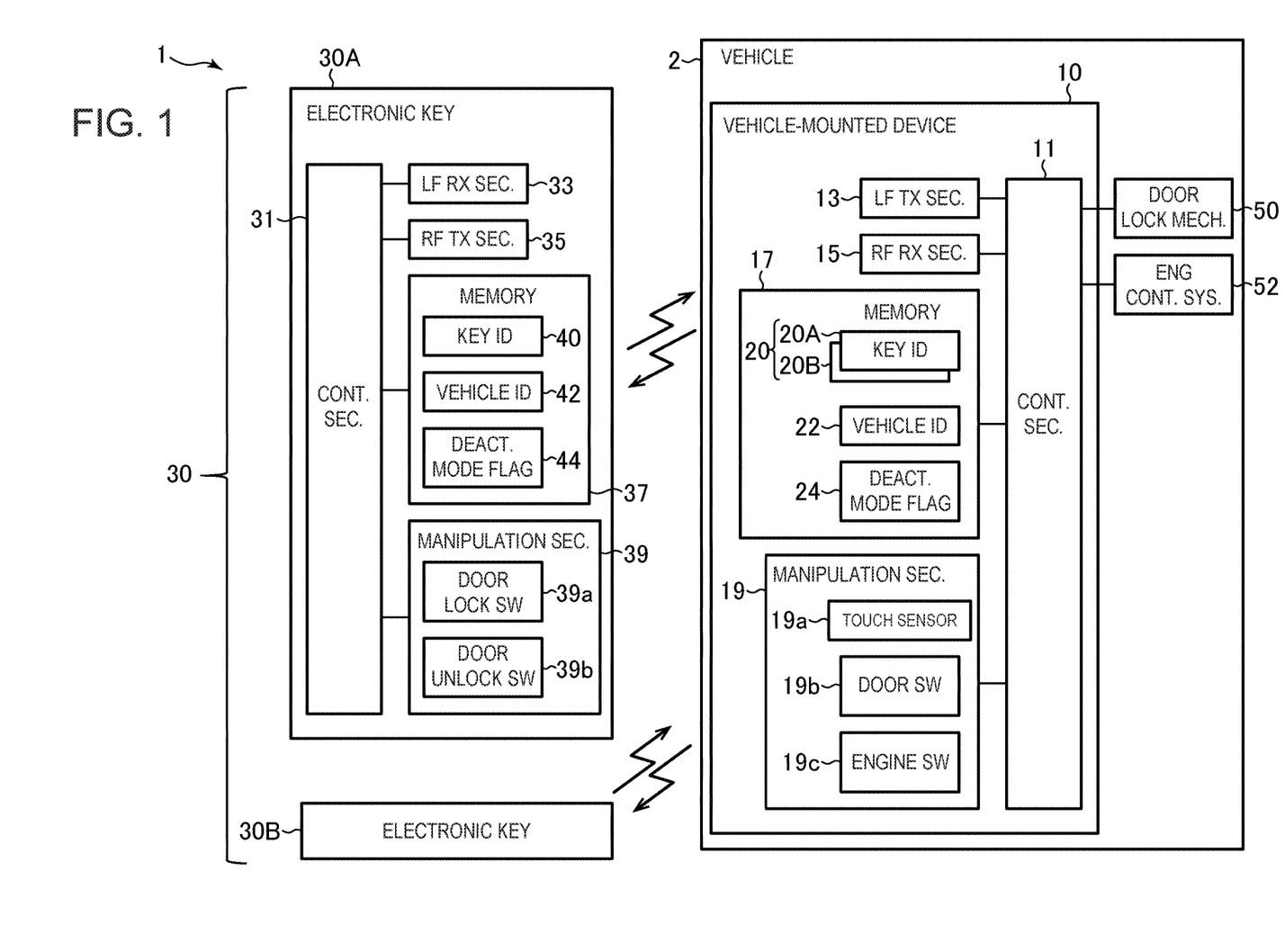
FIG. 1 is a block diagram depicting an electronic key system according to one embodiment of the present invention.

First of all, the configuration of an electronic key system according to one embodiment of the present invention will be described with reference to FIG. 1. FIG. 1 is a block diagram depicting the electronic key system.

As depicted in FIG. 1, the electronic key system 1 according to this embodiment comprises a vehicle-mounted device 10 mounted to a vehicle 2, and electronic keys 30 (30A, 30B) capable of being carried by a user. In the electronic key system 1, based on a smart keyless function, a user who carries the electronic key 30 can cause a given processing to be executed in the vehicle 2, simply by performing a given manipulation. Specifically, the user can automatically unlock a door lock mechanism simply by putting his/her hand on a door knob of a door of the vehicle 2 so as to open the door and then automatically lock the door lock mechanism simply by pushing down a door switch provided on the vehicle 2 when closing the door, and can start an engine simply by pushing down an engine switch.

Each of the components of the electronic key system 1 is configured to selectively operate in either one of a normal mode, i.e., a state in which the smart keyless function is effectively enabled (activated), and a deactivated mode, i.e., a state in which the smart keyless function is temporarily disabled (deactivated).

The vehicle-mounted device 10 comprises a control section 11, a low frequency (LF) transmitting section 13, a radio frequency (RF) receiving section 15, memory 17, and a manipulation section 19.

The control section 11 is composed of a CPU, etc., and configured to output control signals (door lock and door unlock instruction signals, engine start instruction signal) to a door lock mechanism 50 and an engine control system 52 of the vehicle 2, based on processing for communication with the electronic key 30.

The LF transmitting section 13 comprises a transmitter and a transmitting antenna, and is configured to transmit a LF signal to the electronic key 30, based on an instruction of the control section 11. A communicable distance in communication by the LF signal is set to be relatively short, i.e., set such that the communication can be established only when the user is located around or inside the vehicle 2. For example, it is set to about 1 m.

The RF receiving section 15 comprises a receiver and a receiving antenna, and is configured to output a RF signal received from the electronic key 30, to the control section 11. A communicable distance in communication by the RF signal is set to be longer than that of the LF signal. For example, it is set to several tens of meters to about 100 m.

The memory 17 stores therein applications and necessary data for the control section 11. The data stored in the memory 17 includes key IDs 20, a vehicle ID 22, and a deactivated mode flag 24. The key IDs 20 (20A, 20B) are ID information unique to respective one of the plurality of the electronic keys 30 (30A, 30B) exclusively, dedicated to the vehicle 2 (i.e., vehicle-mounted device 10). The vehicle ID 22 is ID information unique to the vehicle 2. The deactivated mode flag 24 is set to ON when the execution of the smart keyless function is being temporarily deactivated (in the deactivated mode), and set to OFF when the execution of the smart keyless function is being enabled (in the normal mode).

The manipulation section 19 includes a touch sensor 19a, a door switch 19b, and an engine switch 19c. The touch sensor 19a is provided on the door knob of the vehicle 2, and disposed such that a hand of the user touches it when he/she puts the hand on the door knob so as to open the door. The touch sensor 19a is configured to output a detection signal (manipulation signal) in response to a touch or an approach of the hand of the user. The door switch 19b is provided on the vehicle 2, such that the user can push down it when closing the door. The door switch 19b is configured to output a manipulation signal when it is pushed down. The engine switch 19c is provided in a vehicle interior, such that the user can push down it when starting the engine. The engine switch 19c is configured to output a manipulation signal when it is pushed down.

The door lock mechanism 50 is provided in each door of the vehicle 2, and configured to lock and unlock the corresponding door in response to receiving of the door lock instruction signal and the door unlock instruction signal from the vehicle-mounted device 10.

The engine control system 52 comprises a control unit for controlling the engine of the vehicle 2, and is configured to start the engine in response to receiving of the engine start instruction signal from the vehicle-mounted device 10.

In this embodiment, the electronic keys 30 include a plurality of the electronic keys 30A, 30B. It should be noted that the number of the electronic keys may be 3 or more. Each of the electronic keys 30 comprises a control section 31, an LF receiving section 33, an RF transmitting section 35, memory 37, and a manipulation section 39. It should be noted here that a combination of the vehicle-mounted device 10 and the electronic key(s) 30 functions as a remote entry system, in addition to the electronic key system. Thus, the electronic keys 30 are also used as a remote controller for a remote entry function.

The control section 31 is composed of a CPU, etc., and configured to execute various processing such as processing for communication with the vehicle-mounted device 10 and the remaining at least one electronic key 30, processing for temporarily deactivating the smart keyless function based on a given manipulation of the manipulation section 39, and processing for restoration from the temporary deactivation based on the given manipulation of the manipulation section 39.

The LF receiving section 33 comprises a receiver and a receiving antenna, and is configured to output an LF signal received from the vehicle-mounted device 10, to the control section 31.

The RF transmitting section 35 comprises a transceiver and a transmitting antenna, and is configured to transmit an RF signal to the vehicle-mounted device 10 based on an instruction of the control section 31.

The memory 37 stores therein applications and necessary data for the control section 31. The data stored in the memory 37 includes a key ID 40, a vehicle ID 42, and a deactivated mode flag 44. The key ID 40 is ID information unique to each of the electronic keys 30. The vehicle ID 42 is ID information unique to the vehicle 2. The deactivated mode flag 44 is set to ON when the execution of the smart keyless function is being temporarily deactivated (in the deactivated mode), and set to OFF when the execution of the smart keyless function is being enabled (in the normal mode).

The manipulation section 39 includes a door lock switch 39a, and a door unlock switch 39b. In the electronic key system 1, the user can temporarily deactivate the smart keyless function (i.e., can shift the operation mode to the deactivated mode) by performing a specific deactivation manipulation, using the door lock switch 39a (e.g., pushing down the door lock switch 39a, continuously for 2 seconds or plural times). Further, the user can cause a restoration from the temporarily deactivated state to an activated state (i.e. can shift the operation mode to the normal mode) by performing a specific restoration manipulation, using the door unlock switch 39b (e.g., pushing down the door unlock switch 39b, continuously for 2 seconds or plural times).

On the other hand, when the electronic key system 1 functions as the remote entry system, the user can unlock and lock the door of the vehicle 2 by manipulating the manipulation section 39 of the electronic key 30. Specifically, when the user pushes down the door lock switch 39a or the door unlock switch 39b, an RF signal (a door lock signal or a door unlock signal) is output from the electronic key 30, and the vehicle-mounted device 10 receiving the RF signal instructs the door lock mechanism 50 to lock or unlock the door.

As above, in this embodiment, the door lock switch 39a and the door unlock switch 39b are used, respectively, for the temporal deactivation and restoration of the smart keyless function. Alternatively, dedicated switches may be provided instead of the switches 39a, 39b. Further, each of the vehicle-mounted device 10 and the electronic key 30 may comprise an indicating section (e.g., light-emitting diodes (LEDs)) for indicating a currently operating control mode (normal mode or deactivated mode).

Figure 2:
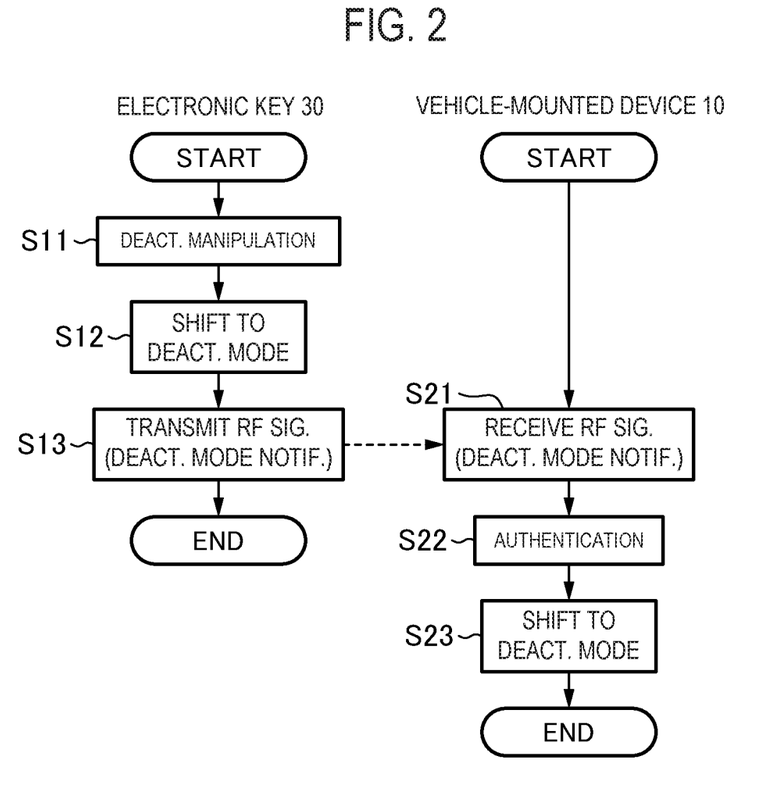
FIG. 2 is an explanatory diagram depicting a flow of processing for deactivating the smart keyless function, in the electronic key system according to this embodiment.

Next, with reference to FIG. 2, the processing for temporarily deactivating the smart keyless function (disabling processing) in the electronic key system according to this embodiment will be described. FIG. 2 is an explanatory diagram depicting a flow of the processing for deactivating the smart keyless function. The following description will be made on the assumption that the electronic key 30 and the vehicle-mounted device 10 in FIG. 2 are operating in the normal mode before start of this processing routine.

For a relay attack countermeasure or the like, the user can temporarily disable the smart keyless function based on his/her own will. First, in the electronic key 30, when the user performs a deactivation manipulation by using the manipulation section 39, the control section 31 receives the deactivation manipulation signal sent from the manipulation section 39 (S11) and then sets the deactivated mode flag 44 to the ON state to shift the electronic key 30 to the deactivated mode (S12).

Subsequently, the control section 31 transmits a deactivated mode notification signal via the RF transmitting section 35 (S13). The deactivated mode notification signal contains the vehicle ID 42, the key ID 40, and the deactivated mode information. The deactivated mode information indicates that the electronic key 30 is operating in the deactivated mode.

Upon receiving the RF signal (deactivated mode notification signal) transmitted from the electronic key 30 (S21), the vehicle-mounted device 10 executes processing for authentication of the received RF signal (S22). Specifically, the control section 11 performs a cross-check between the vehicle ID 42 contained in the RF signal and the vehicle ID 22 stored in the memory 17. Here, the control section 11 may be configured to additionally perform a cross-check between the key ID 40 contained in the RF signal and the key ID 20 stored in the memory 17.

In this authentication processing, when the vehicle ID 42 is coincident with the vehicle ID 22 (success in authentication), this means that the vehicle-mounted device 10 receives an RF signal from the associated electronic key 30. When the authentication has been successively completed, the control section 11 determines whether or not the deactivated mode information is contained in the RF signal. In this example, the deactivated mode information is contained in the RF signal, so that the control section 11 sets the deactivated mode flag 24 in the memory 17 to the ON state (S23: shift to the deactivated mode), and then terminates this processing routine.

On the other hand, in the authentication processing, when the above two vehicle IDs are not coincident with each other (failure in authentication), this means that the RF signal received by the vehicle-mounted device 10 was transmitted from a device other than the associated electronic key 30. Thus, the control section 11 terminates this processing routine in disregard of the received RF signal.

As above, in this embodiment, by performing the deactivation manipulation, using the electronic key 30, a user can shift the electronic key 30 and the vehicle-mounted device 10 from the normal mode to the deactivated mode.

Further, in this embodiment, by performing the restoration manipulation, using the electronic key 30, the control section 31 in the electronic key 30 sets the deactivated mode flag 44 to the OFF state to shift the electronic key 30 to the normal mode, and transmits, to the vehicle-mounted device 10, a normal mode notification signal containing normal mode information indicating that the electronic key 30 is operating in the normal mode. Then, upon receiving the normal mode notification signal, after the authentication processing, the vehicle-mounted device 10 sets the deactivated mode flag 24 to the OFF state to shift the vehicle-mounted device 10 to the normal mode, based on the fact that the normal mode information is contained in the received signal.

Figure 3:
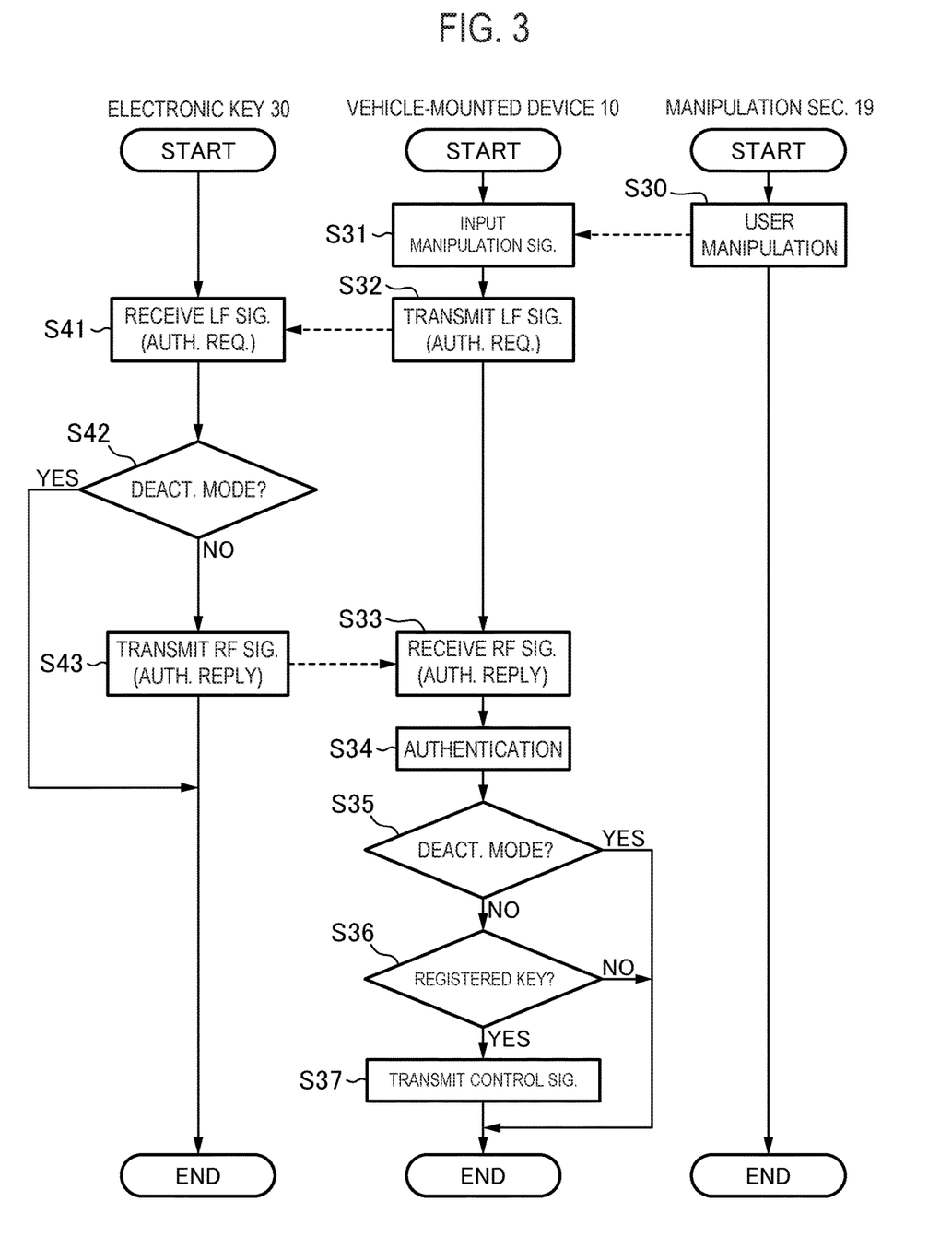
FIG. 3 is an explanatory diagram depicting a basic processing flow of the smart keyless function in the electronic key system according to this embodiment.

Next, with reference to FIG. 3, an outline of the smart keyless function in the electronic key system according to this embodiment will be described. FIG. 3 is an explanatory diagram depicting a basic processing flow of the smart keyless function. The following description will be made on the assumption that the electronic keys 30 and the vehicle-mounted device 10 in FIG. 3 are initially operating in either one of the normal mode or the deactivated mode.

First, when a user who carries the electronic key 30 manipulates one of the sensor and switches of the manipulation section 19 provided in the vehicle 2 (S30), the control section 11 of the vehicle-mounted device 10 receives a manipulation signal corresponding to the manipulated sensor or switch of the manipulation section 19 (S31). Based on the received manipulation signal, the control section 11 operates to transmit an LF signal (S32). This LF signal is an authentication request signal which contains the vehicle ID 22.

In the electronic key 30, the control section 31 receives the LF signal via the LF receiving section 33 (S41). Upon receiving the LF signal, the control section 31 determines whether or not the electronic key 30 is in the deactivated mode (whether the deactivated mode flag 44 is in the ON state or in the OFF state) (S42). When the electronic key 30 is determined to be in the deactivated mode (S42: YES), this processing routine is terminated. On the other hand, when the electronic key 30 is determined not to be in the deactivated mode (S42: NO, i.e., in the normal mode), the control section 31 transmits an RF signal via the RF transmitting section 35 (S43), and then terminates this processing routine. This RF signal is an authentication reply signal which contains the vehicle ID 42, and the key ID 40 of the electronic key 30.

The control section 31 may be configured to execute processing for authentication of the LF signal when the electronic key 30 receives the LF signal. This authentication processing may comprise performing a cross-check between the vehicle ID 22 contained in the LF signal and the vehicle ID 42 stored in the memory 37. In this case, when the two vehicle IDs are coincident with each other, the control section 31 executes the above processing (S42-S43). On the other hand, when the two vehicle IDs are not coincident with each other, the control section 31 terminates this processing routine in disregard of the received LF signal.

In the vehicle-mounted device 10, when the control section 11 receives, via the RF receiving section 15, the RF signal returned by the electronic key 30, within a given time period from the transmitting of the LF signal (S33), the control section 11 performs processing for authentication of the received RF signal (S34). In this authentication processing, as with the step S22 in FIG. 2, the control section 11 performs a cross-check between the vehicle ID 42 contained in the RF signal, and the vehicle ID 22 stored in the memory 17. On the other hand, when the control section 11 does not receive the RF signal within the given time period from the transmitting of the LF signal, the control section 11 terminates this processing routine.

In this authentication processing, when the vehicle ID 42 is coincident with the vehicle ID 22 (success in authentication), this means that the vehicle-mounted device 10 receives an RF signal from the associated electronic key 30. Thus, the control section 11 determines whether or not the vehicle-mounted device 10 is in the deactivated mode (whether the deactivated mode flag 24 is in the ON state or in the OFF state) (S35). On the other hand, when the above two vehicle IDs are not coincident with each other (failure in authentication), this means that the RF signal received by the vehicle-mounted device 10 was transmitted from a device other than the associated electronic key 30. Thus, the control section 11 terminates this processing routine in disregard of the received RF signal.

When the vehicle-mounted device 10 is determined to be in the deactivated mode (S35: YES), this processing routine is terminated. On the other hand, when the vehicle-mounted device 10 is determined not to be in the deactivated mode (S35: NO, i.e., in the normal mode), the control section 11 determines whether or not the received RF signal was transmitted from one of the plurality of electronic keys 30 registered in the memory 17 of the vehicle-mounted device 10 (i.e., one of the plurality of electronic keys 30 associated with (dedicated to) the vehicle 2) (S36). Specifically, the control section 11 determines whether or not the key ID 40 contained in the received RF signal is coincident with one of the key IDs 20 (20A, 20B) stored (i.e., registered) in the memory 17.

When the key ID 40 contained in the received RF signal is not registered in the vehicle-mounted device 10 (S36: NO), this processing routine is terminated. On the other hand, when the key ID 40 contained in the received RF signal is registered in the vehicle-mounted device 10 (S36: YES), the control section 11 operates to transmit a given control signal (S37), and then terminates this processing routine.

In a case where the touch sensor 19a is manipulated, the door unlock instruction signal is output as the given control signal to the door lock mechanism 50, and, in the case where the door switch 19b is manipulated, the door lock instruction signal is output as the given control signal to the door lock mechanism 50. Further, in the case where the engine switch 19c is manipulated, the engine start instruction signal is output as the given control signal to the engine control system 52.

As above, in the electronic key system 1, in a situation where both the electronic key 30 and the vehicle-mounted device 10 are in the normal mode in which the smart keyless function is effective (S42: NO, and S35: NO), the user who carries the electronic key 30 can perform a given manipulation to execute the given processing in the vehicle 2. That is, in the normal mode, the given wireless communication processing (S32 to S36 and S41 to S43) including transmitting of the authentication request signal and returning of the authentication reply signal is executed between the vehicle-mounted device 10 and the electronic key 30, and if this wireless communication processing is successfully completed, the given processing will be automatically executed.

However, in a situation where at least one of the electronic keys 30 and the vehicle-mounted device 10 is in the deactivated mode (S42: YES and/or S35: YES), the above given wireless communication processing is not successfully completed, so that the given processing is not executed, i.e., the smart keyless function is disabled.

By manipulating the manipulation section 39 of the electronic key 30, the user can shift the electronic key 30 to the deactivated mode and further shift the vehicle-mounted device 10 to the deactivated mode. However, when the user performs the deactivation manipulation (S11) by using the electronic key 30A in the plurality of electronic keys 30, at least the electronic key 30A can be shifted to the deactivated mode, but the electronic key 30B which has not undergone the deactivation manipulation still remains in the normal mode.

Further, in the processing depicted in FIG. 2, the electronic key 30 transmits the RF signal (S13) after the shift to the deactivated mode (S12). In this situation, there is a possibility that the vehicle-mounted device 10 cannot receive the transmitted RF signal. For example, this can occur when the user performs the deactivation manipulation (S11) by using the electronic key 30 which is located away from the vehicle-mounted device 10 by a distance greater than a transmittable distance of the RF signal. In this situation, although the electronic key 30 can be shifted to the deactivated mode, the vehicle-mounted device 10 still remains in the normal mode.

As above, in the electronic key system 1 according to this embodiment, each of the electronic keys 30A, 30B and the vehicle-mounted device 10 is configured to be operable independently in a selected one of the deactivated mode and the normal mode. However, in this embodiment, as long as at least one of a combination of the electronic key 30 and the vehicle-mounted device 10 (the electronic key 30A and the vehicle-mounted device 10, or the electronic key 30B and the vehicle-mounted device 10) is in the deactivated mode, it is possible to prevent the relay attack.

Further, in this embodiment, the vehicle-mounted device 10 is configured to transmit the LF signal in response to manipulation of the manipulation section 19, irrespective of the control mode (the normal mode or the deactivated mode) (S32). Here, the vehicle-mounted device 10 may be configured not to transmit the LF signal when it is in the deactivated mode. In this case, when the vehicle-mounted device 10 is in the deactivated mode, the steps S32 to S37 and S41 to S43 in FIG. 3 are never executed. Thus, it is possible to reliably protect the vehicle 2 from the relay attack.

However, if the vehicle-mounted device 10 receives the RF signal in response to the transmitting of the LF signal in the deactivated mode, it is possible to determine that the vehicle 2 might be under the relay arrack. Then, by recording this fact or informing the outside of the vehicle of this fact, it becomes possible to more reliably inhibit the relay attack. Therefore, transmitting the LF signal from the vehicle-mounted device 10 even in the deactivated mode is useful.

For example, the situation where the vehicle-mounted device 10 is shifted to the deactivated mode by using the electronic key 30A, and the electronic key 30B still remains in the normal mode, is described above. In this situation, if the vehicle 2 is subjected to the relay attack under the combination of the electronic key 30B and the vehicle-mounted device 10, the electronic key 30B being in the normal mode can receive the LF signal transmitted from the vehicle-mounted device 10 (S32) and return the RF signal (S42: NO, S43), and the vehicle-mounted device 10 can receive the transmitted reply signal (S33). The vehicle-mounted device 10 can be configured to, in response to receiving the RF signal during the deactivated mode in the above manner, record this fact or inform the outside of this fact. In this embodiment, the vehicle-mounted device 10 is configured not to execute the given processing (S37) (e.g., configured not to cause the door lock mechanism of the vehicle 2 to be unlocked) as long as it is in the deactivated mode (S35: YES), even when receiving the RF signal (S33). Thus, even in the above situation, it is possible to protect the vehicle 2 from the relay attack.

Further, the situation where although the electronic key 30 has been shifted to the deactivated mode, the vehicle-mounted device 10 still remains in the normal mode, is described above. In this situation, if the vehicle 2 is subjected to the relay attack, the electronic key 30 can receive the LF signal transmitted from the vehicle-mounted device 10 (S32). However, despite receiving the LF signal, the electronic key 30 never returns the RF signal because it is in the deactivated mode (S42: YES). Therefore, as long as the electronic key 30 is in the deactivated mode even when the vehicle-mounted device 10 is not in the deactivated mode, the vehicle-mounted device 10 never receives the RF signal in the step S33, so that the given processing is never executed. Thus, it is possible to protect the vehicle 2 from the relay attack.

As above, in this embodiment, no RF signal is returned from the electronic key 30 which has been subjected to the manipulation for shift to the deactivated mode (deactivation manipulation), so that it is possible to prevent the relay attack even when the vehicle-mounted device 10 is not in the deactivated mode. Further, in this embodiment, the RF signal itself is not returned from the electronic key 30 which has been subjected to the deactivation manipulation. Thus, as compared with an electronic key system configured such that the RF signal is returned from the electronic key 30 which has been subjected to the deactivation manipulation, and the vehicle-mounted device 10 being in the deactivated mode disregards the transmitted RF signal, it is possible to provide enhanced security.

Next, the functions of the electronic key system 1 according to the above embodiment will be described.

In the above embodiment, during the course of execution of the given wireless communication processing (S32 to S36 and S41 to S43 in FIG. 3) between the vehicle-mounted device 10 and the electronic key 30, even when the vehicle-mounted device 10 receives the RF signal (authentication reply signal) from the electronic key 30 (S33) after transmitting the LF signal (authentication request signal) to the electronic key 30 (S32), the vehicle-mounted device 10 does not execute the given processing (S37) as long as it is operating in the deactivated mode (S35: YES), or, even when the electronic key 30 receives the LF signal (authentication request signal) from the vehicle-mounted device 10 (S41), the electronic key 30 does not transmit the RF signal (authentication reply signal) responding to the LF signal as long as it is operating in the deactivated mode (S42: YES), so that the given wireless communication processing is never successfully completed, and thereby the given processing (S37) is inhibited from being executed by the vehicle-mounted device 10. As above, in the above embodiment, as long as at least one of the vehicle-mounted device 10 and the electronic key 30 is in the deactivated mode, the smart keyless function can be disabled to protect the vehicle from the relay attack. That is, as long as at least one of a combination of the vehicle-mounted device 10 and one of the plurality of electronic keys 30A, 30A is in the deactivated mode, it becomes possible to effectively cope with the relay attack. Thus, for example, even in a situation where only one of the electronic keys 30 (the electronic key 30A, for example) is in the deactivated mode, it becomes possible to effectively cope with the relay attack, even under the combination of the vehicle-mounted device 10 and any one of the electronic keys as long as at least the vehicle-mounted device 10 is in the deactivated mode. On the other hand, under a combination of the vehicle-mounted device 10 and one of the electronic keys 30 being in the deactivated mode (the electronic key 30A, for example), it becomes possible to effectively cope with the relay attack, irrespective of the control mode of the vehicle-mounted device 10. Therefore, in the above embodiment, it is possible to reliably fulfill the function of a relay attack countermeasure even when there are a plurality of electronic keys 30A, 30B.

In the above embodiment, each of the vehicle-mounted device 10 and the plurality of electronic keys 30A, 30B is operable independently in either one of the normal mode and the deactivated mode in a selective manner. Thus, in the above embodiment, each of the vehicle-mounted device 10 and the electronic keys 30A, 30B can be shifted to the deactivated mode, independently. Thus, there is a possibility that one constituting the combination of the vehicle-mounted device 10 and one of the electronic keys 30 is in the deactivated mode and the other is in the normal mode, when the vehicle is subjected to the relay attack. However, in the above embodiment, as long as at least one constituting the combination of the vehicle-mounted device 10 and one of the electronic keys 30 is in the deactivated mode, it becomes possible to effectively cope with the relay attack. Thus, the user can protect the vehicle 2 from the relay attack simply by shifting at least one of the vehicle-mounted device 10 and one of the electronic keys 30 to the deactivated mode. For example, as long as the vehicle-mounted device 10 and the electronic key 30A are shifted to the deactivated mode, the user can prevent the relay attack, even when the other electronic key 30B is in the normal mode.

In the above embodiment, each of the electronic keys 30A, 30B comprises the door lock switch 39a (mode-shifting manipulation member) for causing a shift from the normal mode to the deactivated mode, wherein each of the electronic keys 30A, 30B is operable, in response to manipulation of the door lock switch 39a, to be shifted to the deactivated mode. Thus, in the above embodiment, the user can shift each of the electronic keys 30 to the deactivated mode by manipulating the door lock switch 39a.

In the above embodiment, each of the electronic keys 30 is operable, upon the shift to the deactivated mode, to transmit the deactivated mode notification signal, and the vehicle-mounted device 10 is operable, in response to receiving the deactivated mode notification signal, to be shifted to the deactivated mode. Thus, in the above embodiment, the user can shift each of the electronic keys 30 to the deactivated mode and further shift the vehicle-mounted device 10 to the deactivated mode, by manipulating the electronic key 30.

In the above embodiment, each of the electronic keys 30 comprises the door unlock switch 39b (mode-restoring manipulation member), wherein each of the electronic keys 30 is operable, in response to manipulation of the door unlock switch 39b, to be restored to the normal mode, while transmitting the normal mode notification signal, and the vehicle-mounted device 10 is operable, in response to receiving the normal mode notification signal, to be restored to the normal mode. Thus, in the above embodiment, the user can restore each of the electronic keys 30 to the normal mode and further restore the vehicle-mounted device 10 to the normal mode, by manipulating the door unlock switch 39b of the electronic key 30.

In the above embodiment, each of the vehicle-mounted device 10 and the electronic keys 30 comprises the memory (17, 37), wherein the memory (17, 37) stores therein the deactivated mode flag (24, 44) for distinguishing the deactivated mode from the normal mode. Thus, in the above embodiment, each of the vehicle-mounted device 10 and the electronic keys 30 can be easily controlled with respect to the control modes of the deactivated mode and the normal mode, using the deactivated mode flag (24, 44) stored in the memory (17, 37).

LIST OF REFERENCE CHARACTERS

1: electronic key system
2: vehicle

10: vehicle-mounted device
30 (30A, 30B): electronic key
50: door lock mechanism
52: engine control system

The invention claimed is:

1. An electronic key system comprising:
a vehicle-mounted device mounted to a vehicle; and
a plurality of electronic keys, each wirelessly communicable with the vehicle-mounted device,
wherein the electronic key system is configured to have:
a normal mode in which a given processing is permitted to be executed by the vehicle-mounted device when a given wireless communication processing between the vehicle-mounted device and any one of the plurality of electronic keys is successfully completed; and
a deactivated mode in which the given processing is inhibited from being executed by the vehicle-mounted device,
wherein the vehicle-mounted device is configured to execute, in the normal mode, the given processing in response to receiving a reply signal from the one electronic key after transmitting a given radio signal to the one electronic key, during the given wireless communication processing, but not to execute, in the deactivated mode, the given processing even when receiving the reply signal after the transmitting of the radio signal; and
wherein the one electronic key is configured to, in the normal mode, transmit the reply signal in response to receiving the radio signal, during the given wireless communication processing, but to, in the deactivated mode, avoid transmitting of the reply signal even when receiving the radio signal.

2. The electronic key system as recited in claim 1, wherein each of the vehicle-mounted device and the plurality of electronic keys is operable independently in either one of the normal mode and the deactivated mode in a selective manner.

3. The electronic key system as recited in claim 1, wherein each of the plurality of electronic keys comprises a mode-shifting manipulation member for causing a shift from the normal mode to the deactivated mode, each of the plurality of electronic keys being operable, in response to manipulation of the mode-shifting manipulation member thereof, to be shifted to the deactivated mode.

4. The electronic key system as recited in claim 3, wherein each of the plurality of electronic keys is operable, upon a shift to the deactivated mode, to transmit a deactivated mode notification signal, and the vehicle-mounted device is operable, in response to receiving the deactivated mode notification signal, to be shifted to the deactivated mode.

5. The electronic key system as recited in claim 1, wherein:
each of the plurality of electronic keys comprises a mode-restoring manipulation member, each of the plurality of electronic keys being operable, in response to manipulation of the mode-restoring manipulation member thereof, to be restored to the normal mode, while transmitting a normal mode notification signal; and
the vehicle-mounted device is operable, in response to receiving the normal mode notification signal, to be restored to the normal mode.

6. The electronic key system as recited in claim 1, wherein each of the vehicle-mounted device and the plurality of electronic keys comprises memory, the memory storing therein a deactivated mode flag for distinguishing the deactivated mode from the normal mode.

* * * * *